US012506842B2

(12) United States Patent
Djelouah et al.

(10) Patent No.: US 12,506,842 B2
(45) Date of Patent: Dec. 23, 2025

(54) UNCERTAINTY-GUIDED FRAME INTERPOLATION FOR VIDEO RENDERING

(71) Applicants: Disney Enterprises, Inc., Burbank, CA (US); ETH Zürich (EIDGENÖSSISCHE TECHNISCHE HOCHSCHULE ZÜRICH), Zurich (CH)

(72) Inventors: Abdelaziz Djelouah, Zürich (CH); Karlis Martins Briedis, Zurich (CH); Markus Plack, Bonn (DE); Christopher Richard Schroers, Uster (CH)

(73) Assignees: Disney Enterprises, Inc., Burbank, CA (US); ETH Zürich (EIDGENÖSSISCHE TECHNISCHE HOCHSCHULE ZÜRICH), Zurich (CH)

( * ) Notice: Subject to any disclaimer, the term of this patent is extended or adjusted under 35 U.S.C. 154(b) by 312 days.

(21) Appl. No.: 18/388,668

(22) Filed: Nov. 10, 2023

(65) Prior Publication Data
US 2024/0163395 A1 May 16, 2024

Related U.S. Application Data

(60) Provisional application No. 63/424,358, filed on Nov. 10, 2022.

(51) Int. Cl.
*H04N 7/01* (2006.01)
*G06T 3/18* (2024.01)
*G06T 3/40* (2006.01)

(52) U.S. Cl.
CPC ............. *H04N 7/0135* (2013.01); *G06T 3/18* (2024.01); *G06T 3/40* (2013.01)

(58) Field of Classification Search
CPC .................................................... H04N 7/0135
See application file for complete search history.

(56) References Cited

U.S. PATENT DOCUMENTS

2016/0366366 A1* 12/2016 Chen .................... H04N 7/0127

OTHER PUBLICATIONS

Zhouyong Liu, Shun Loo, Wobin Li, Jingben Lu, Yafan Wu, Shilei Sun, Chunguo Li, Luxi Yang "ConvTransformer: A Convolution Transformer Network for Video Frame Synthesis" ArXiv abs/2011.10185 (2020) 17 Pgs.

(Continued)

*Primary Examiner* — Michael H Hong
(74) *Attorney, Agent, or Firm* — Farjami & Farjami LLP

(57) ABSTRACT

A system includes a hardware processor, a memory storing software code, and a machine learning (ML) model-based video frame interpolator. The hardware processor executes the software code to provide first and second frames of a video sequence including a plurality of frames, respective binary masks for the first and second frames, and optionally an intermediate frame of the video sequence between the first and second frames and a binary mask for the intermediate frame, as interpolation inputs to the ML model-based video frame interpolator. The hardware processor further executes the software code to generate, using the ML model-based video frame interpolator and the interpolation inputs, an interpolated frame and an error map for the interpolated frame, wherein generating the interpolated frame and the error map includes a cross-backward warping of respective latent feature representations of each of the plurality of frames.

20 Claims, 6 Drawing Sheets

(56) References Cited

OTHER PUBLICATIONS

Zhixiang Chi, Rasoul Mohammadi Nasiri, Zheng Liu, Yuanhao Yo, Jowei Lu, Jin Tang, Konstantinos N. Plataniotis "Error-Aware Spatial Ensembles for Video Frame Interpolation" ArXiv abs/2207.12305 (2022): 10 Pgs.

Fitsum Reda, Janne Kontkanen, Eric Tabellion, Deqing Sun, Caroline Pantofaru, Brian Curless "FILM: Frame Interpolation for Large Motion" abs/2202.04901 (2022): 19 Pgs.

Zhouyong Liu, Shun Luo, Wubin Li, Jingben Lu, Yufan Wu, Shilei Sun, Chuong Li, Luxi Yang "ConvTransformer: A Convolution Transformer Network for Video Frame Synthesis" ArXiv Nov. 20, 2020 17 Pgs.

Zhixang Chi, Rasoul Mohammadi Nasiri, Zheng Liu, Yuanhao Yu, Juwei Lu, Jin Tang, Konstantinos N. Plataniotis "Error-Aware Spatial Ensemble for Video Frame Inerpolation" ArXiv Jul. 25, 2022 10 Pgs.

Fitsum Reda, Janne Kontkanen, Eric Tabellion, Deqing Sun, Caroline Paantofaru, Brian Curless "FILM: Frame Interpolation for Large Motion" ECCV Feb. 10, 2022 19 Pgs.

* cited by examiner

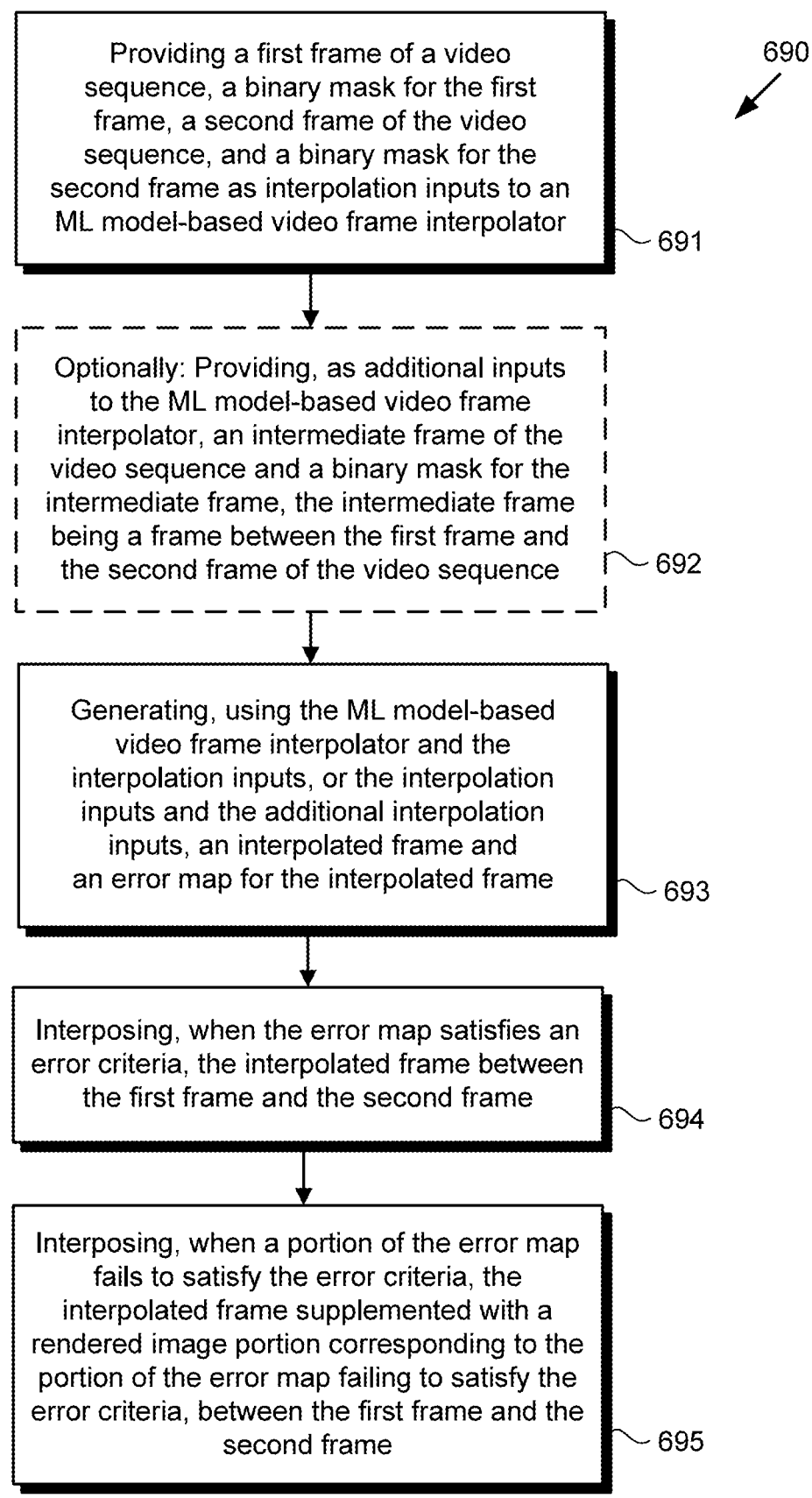

UNCERTAINTY-GUIDED FRAME INTERPOLATION FOR VIDEO RENDERING

RELATED APPLICATIONS

The present application claims the benefit of and priority to a U.S. Provisional Patent Application Ser. No. 63/424,358 filed on Nov. 10, 2022, and titled "Uncertainty-Guided Frame Interpolation Transformer for Video Rendering," which is hereby incorporated fully by reference into the present application.

BACKGROUND

Video frame interpolation enables many practical applications, such as video editing, novel-view synthesis, video retiming, and slow motion generation, for example. Recently, different deep learning video frame interpolation methods have been proposed. However, those conventional methods fail to generalize their interpolation results to animated data. In addition, retraining a method for each specific use case is not a viable solution, as the data statistics in video content or can vary drastically, sometimes even within the same scene. Thus, despite recent advances in the field, video frame interpolation remains an open challenge due to the complex lighting effects and large motion that are ubiquitous in video content and can introduce severe artifacts for existing methods.

BRIEF DESCRIPTION OF THE DRAWINGS

FIG. 6 shows a flowchart outlining a method for performing uncertainty-guided video frame interpolation, according to one implementation.

DETAILED DESCRIPTION

Figure 1:
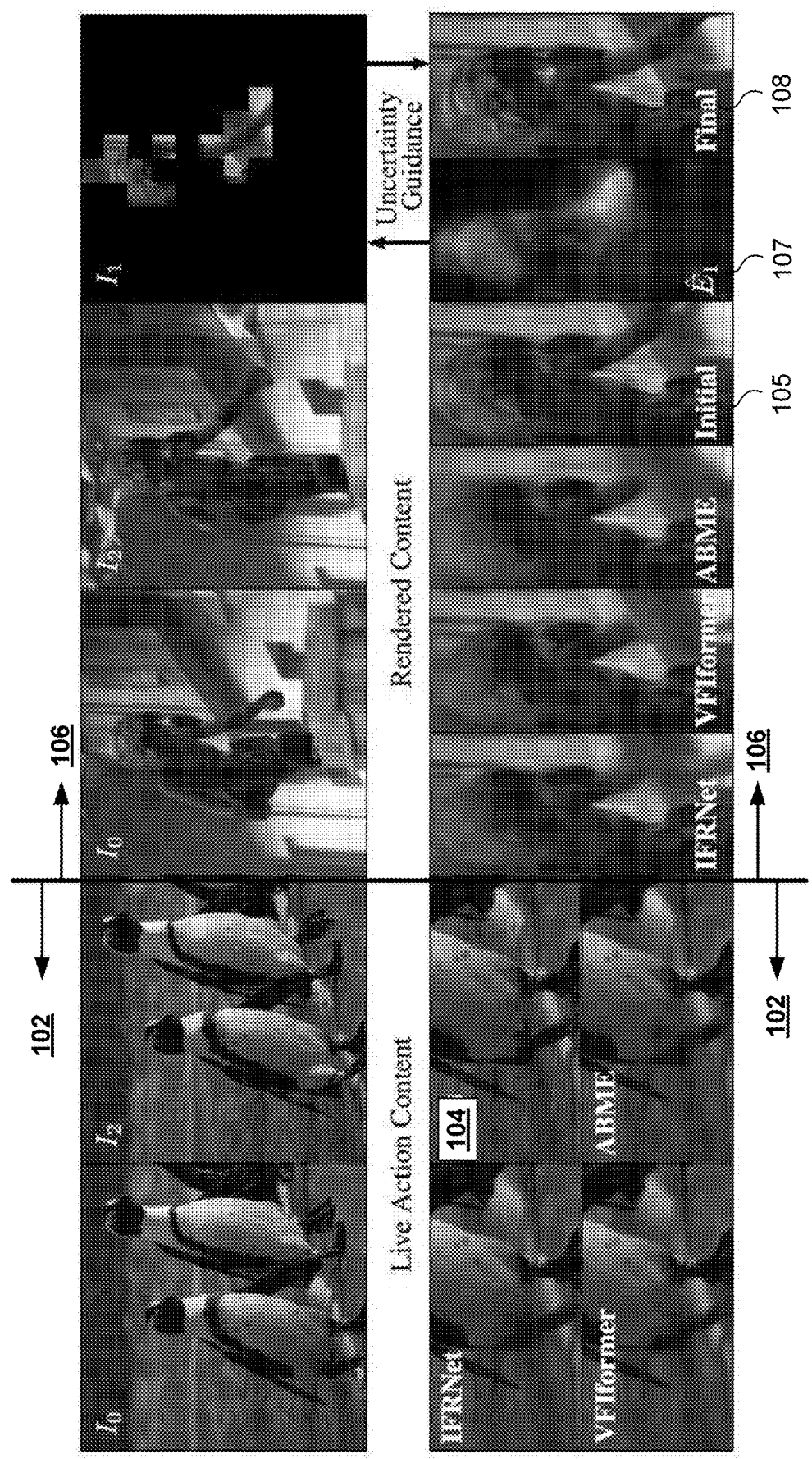
FIG. 1 shows a comparison of results achieved using the uncertainty-guided video frame interpolation solution disclosed by the present application with results produced using conventional approaches, for live action content and rendered content.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As noted above, video frame interpolation enables many practical applications, such as video editing, novel-view synthesis, video retiming, and slow motion generation, to name a few. As further noted above, although different deep learning video frame interpolation methods have been proposed recently, those conventional methods fail to generalize their interpolation results to animated data. Moreover, retraining a method for each specific use case is not a viable solution, as the data statistics in video content or can vary drastically, sometimes even within the same scene. Thus, despite recent advances in the field, video frame interpolation remains an open challenge due to the complex lighting effects and large motion that are ubiquitous in video content and can introduce severe artifacts for existing methods.

The present disclosure provides a deep learning-based uncertainty-guided video frame interpolation solution that addresses and overcomes the deficiencies in the conventional art. In one implementation, the present uncertainty-guided video frame interpolation solution includes a machine learning model-based video frame interpolator capable of estimating the expected error together with the interpolated frame. For example, the machine learning model-based video frame interpolator may incorporate known regions of an intermediate frame to improve interpolation quality. As another example, a training procedure is provided to include inputs of the intermediate frame. As a further example, the machine learning model-based video frame interpolator may be trained to be aware of uncertainties in the output and that can be used to determine the expected quality. Also, the uncertainty information may be utilized to guide a second rendering pass, which may further improve interpolation quality.

One key difference the deep learning-based uncertainty-guided video frame interpolation solution disclosed in the present application from conventional approaches is that, in one implementation, the machine learning model-based video frame interpolator disclosed herein is capable of incorporating known regions of the intermediate frame to achieve improved interpolation quality. Other key differences are in the training procedure and the capacity to handle partially rendered frames in frame interpolation. The machine learning model-based video frame interpolator of the present disclosure offers a number of advantages. For example, the machine learning model-based video frame interpolator disclosed herein improves the generalization capabilities of the method across video content of a variety of types. In addition, a partial rendering pass of the intermediate frame, guided by the predicted error, can be utilized during the interpolation to generate a new frame of superior quality. Through error-estimation, the machine learning model-based video frame interpolator disclosed herein can boost the evaluation metrics even further and provide results meeting the desired quality using a fraction of the time compared to a full rendering of the intermediate frame. Furthermore, the novel and inventive approach disclosed by the present application may advantageously be implemented as a substantially automated solution.

It is noted that, as used in the present application, the terms "automation," "automated," "automating," and "automatically" refer to systems and processes that do not require the participation of a human system operator. Although, in some implementations, a system operator or administrator may review or even adjust the performance of the automated systems and according to the automated methods described herein, that human involvement is optional. Thus, the methods described in the present application may be performed under the control of hardware processing components of the disclosed automated systems.

It is further noted that, as defined in the present application, the expression "machine learning model" (hereinafter "ML model") may refer to a mathematical model for making future predictions based on patterns learned from samples of data or "training data." For example, ML models may be trained to perform image processing, natural language understanding (NLU), and other inferential data processing tasks. Various learning algorithms can be used to map correlations between input data and output data. These correlations form the mathematical model that can be used to make future predictions on new input data. Such a predictive model may include one or more logistic regression models, Bayesian models, or artificial neural networks (NNs). A "deep neural network," in the context of deep learning, may refer to a NN that utilizes multiple hidden layers between input and output layers, which may allow for learning based on features not explicitly defined in raw data. As used in the present application, a feature identified as a NN refers to a deep neural network.

FIG. 1 shows a comparison of the results achieved using the uncertainty-guided video frame interpolation solution disclosed by the present application with results produced using conventional approaches for two different types of content: live action content 102 and rendered content 106. As shown in FIG. 1, conventional approaches to interpolating live action content 102 produce penguin images identified as IFRNet (Intermediate Feature Refine Network), VFIformer (Video Frame Interpolation with Transformer), and ABME (Asymmetric Bilateral Motion Estimation). By contrast the present method interpolates live action content 102, producing penguin image 104. On the difficult animated example of rendered content 106 shown in FIG. 1, the conventional interpolation methods IFRNet, VFIformer, and ABME struggle to produce crisp textures and faithfully reconstruct the arm of the depicted character. The initial interpolation resulting from the present uncertainty-guided interpolation solution struggles to produce crisp textures and faithfully reconstruct the arm of the depicted character as well, as shown by initial image 105. However, use of the error estimation 107 provided by the ML model-based video frame interpolator implemented by the present uncertainty-guided interpolation solution and described in greater detail below by reference to FIG. 3 predicts what portion of interpolated image may be of inadequate quality. To compensate for the predicted lack of image quality, a fraction of the intermediate frame (such as approximately 9.7% of the intermediate frame for example) may be rendered and used in a second interpolation pass to improve the quality of final output 108.

Figure 2:
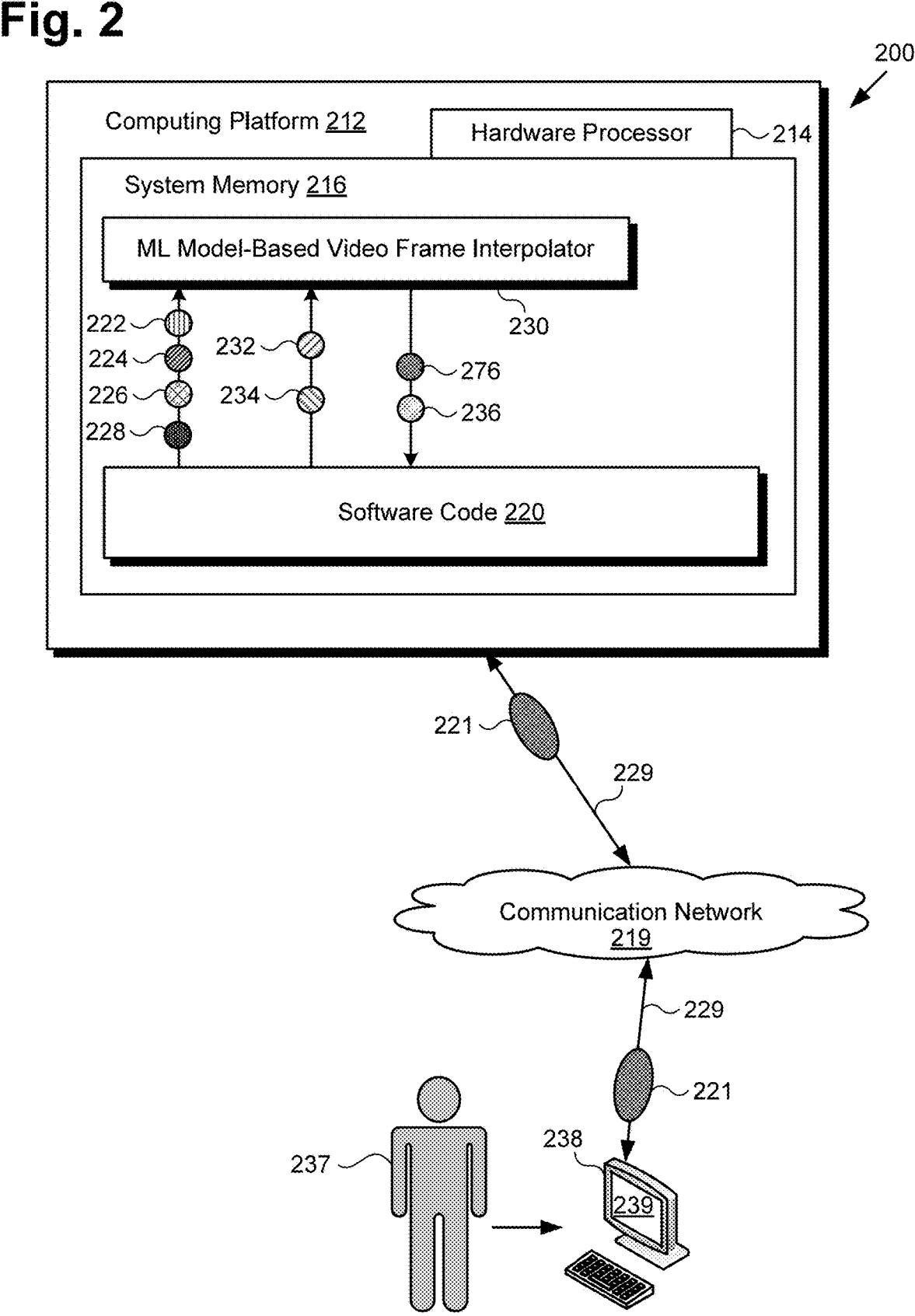
FIG. 2 shows a diagram of a system for performing uncertainty-guided video frame interpolation, according to one exemplary implementation.

FIG. 2 shows exemplary system 200 for performing uncertainty-guided video frame interpolation, according to one implementation. As shown in FIG. 2, system 200 includes computing platform 212 having hardware processor 214 and system memory 216 implemented as a computer-readable non-transitory storage medium. According to the present exemplary implementation, system memory 216 stores software code 220 and ML model-based video frame interpolator 230.

As further shown in FIG. 2, system 200 is implemented within a use environment including communication network 219, user system 238 including display 239, and user 237 of user system 238. In addition, FIG. 2 shows video sequence 221 received by system 200 from user system 238, first frame 222 of video sequence 221, binary mask 224 for first frame 222, second frame 226 of video sequence 221, binary mask 228 for second frame 226, intermediate frame 232 of video sequence 221 (i.e., a video frame between first frame 222 and second frame 226), binary mask 234 for intermediate frame 232, as well as interpolated frame 236 and error map 276 for interpolated frame 236 generated by ML model-based video frame interpolator 230. Also shown in FIG. 2 are network communication links 229 of communication network 219 interactively connecting system 200 and user system 238.

With respect to the binary masks 224, 228, and 234, it is noted that a binary mask is an image of the same size as the color frame with which it is associated. Each pixel of a binary mask is either 1, indicating that the corresponding color pixel is valid, or 0 for invalid pixels. Initially, first frame 222 and second frame 226 contain only 1s in their respective binary masks 224 and 228, while binary mask 234 for intermediate frame 232 is full of 0 s. Once portions of intermediate frame 232 have been rendered and hence are valid inputs, the pixels of binary mask 234 corresponding to the rendered portion of intermediate 232 are set to 1.

It is further noted that video sequence 221 includes a plurality of video frames including first frame 222, second frame 226, and intermediate frame 232. It is also noted that "first" frame 222 of video sequence 221 may be any frame of video sequence 221 preceding intermediate frame 232, "second" frame 226 may be any frame of video sequence 221 following "first" frame 222 and intermediate frame 232, and intermediate frame 232 is a frame between first frame 222 and second frame 226. Thus, first frame 222 may be the first frame of video sequence 221, the fifth frame of video sequence 221, the tenth frame of video sequence 221, and so forth, while second frame 226 may be any subsequent frame.

Although the present application refers to software code 220 and ML model-based video frame interpolator 230 as being stored in system memory 216 for conceptual clarity, more generally, system memory 216 may take the form of any computer-readable non-transitory storage medium. The expression "computer-readable non-transitory storage medium," as used in the present application, refers to any medium, excluding a carrier wave or other transitory signal that provides instructions to hardware processor 214 of computing platform 212. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs such as DVDs, RAM, programmable read-only memory (PROM), erasable PROM (EPROM), and FLASH memory.

Moreover, in some implementations, system 200 may utilize a decentralized secure digital ledger in addition to, or in place of, system memory 216. Examples of such decentralized secure digital ledgers may include a blockchain, hashgraph, directed acyclic graph (DAG), and Holochain® ledger, to name a few. In use cases in which the decentralized secure digital ledger is a blockchain ledger, it may be advantageous or desirable for the decentralized secure digital ledger to utilize a consensus mechanism having a proof-of-stake (PoS) protocol, rather than the more energy intensive proof-of-work (PoW) protocol.

Although FIG. 2 depicts software code 220 and ML model-based video frame interpolator 230 as being co-located in system memory 216, that representation is also provided merely as an aid to conceptual clarity. More generally, system 200 may include one or more computing platforms 212, such as computer servers for example, which may be co-located, or may form an interactively linked but distributed system, such as a cloud-based system, for instance. As a result, hardware processor 214 and system memory 216 may correspond to distributed processor and memory resources within system 200. Consequently, in some implementations, one or more of software code 220 and ML model-based video frame interpolator 230 may be stored remotely from one another on the distributed memory resources of system 200. It is also noted that, in some implementations, ML model-based video frame interpolator 230 may take the form of one or more software modules included in software code 220.

Hardware processor 214 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 212, as well as a Control Unit (CU) for retrieving programs, such as software code 220, from system memory 216, while a GPU may be implemented to reduce the processing overhead of the CPU by performing computationally intensive graphics or other processing tasks. A TPU is an application-specific integrated circuit (ASIC) configured specifically for AI processes such as machine learning.

In some implementations, computing platform 212 may correspond to one or more web servers accessible over a packet-switched network such as the Internet, for example. Alternatively, computing platform 212 may correspond to one or more computer servers supporting a wide area network (WAN), a local area network (LAN), or included in another type of private or limited distribution network. In addition, or alternatively, in some implementations, system 200 may utilize a local area broadcast method, such as User Datagram Protocol (UDP) or Bluetooth, for instance. Furthermore, in some implementations, system 200 may be implemented virtually, such as in a data center. For example, in some implementations, system 200 may be implemented in software, or as virtual machines. Moreover, in some implementations, communication network 219 may be a high-speed network suitable for high performance computing (HPC), for example a 10 GigE network or an Infiniband network.

It is further noted that, although user system 238 is shown as a desktop computer in FIG. 2, that representation is provided merely by way of example. In other implementations, user system 238 may take the form of any suitable mobile or stationary computing device or system that implements data processing capabilities sufficient to provide a user interface, support connections to communication network 219, and implement the functionality ascribed to user system 238 herein. That is to say, in other implementations, user system 238 may take the form of a laptop computer, tablet computer, or smartphone, to name a few examples. Alternatively, in some implementations, user system 238 may be a "dumb terminal" peripheral device of system 200. In those implementations, display 239 may be controlled by hardware processor 214 of computing platform 212.

It is also noted that display 239 of user system 238 may take the form of a liquid crystal display (LCD), a light-emitting diode (LED) display, an organic light-emitting diode (OLED) display, a quantum dot (QD) display, or any other suitable display screen that perform a physical transformation of signals to light. Furthermore, display 239 may be physically integrated with user system 238 or may be communicatively coupled to but physically separate from user system 238. For example, where user system 238 is implemented as a smartphone, laptop computer, or tablet computer, display 239 will typically be integrated with user system 238. By contrast, where user system 238 is implemented as a desktop computer, display 239 may take the form of a monitor separate from user system 238 in the form of a computer tower.

Figure 3:
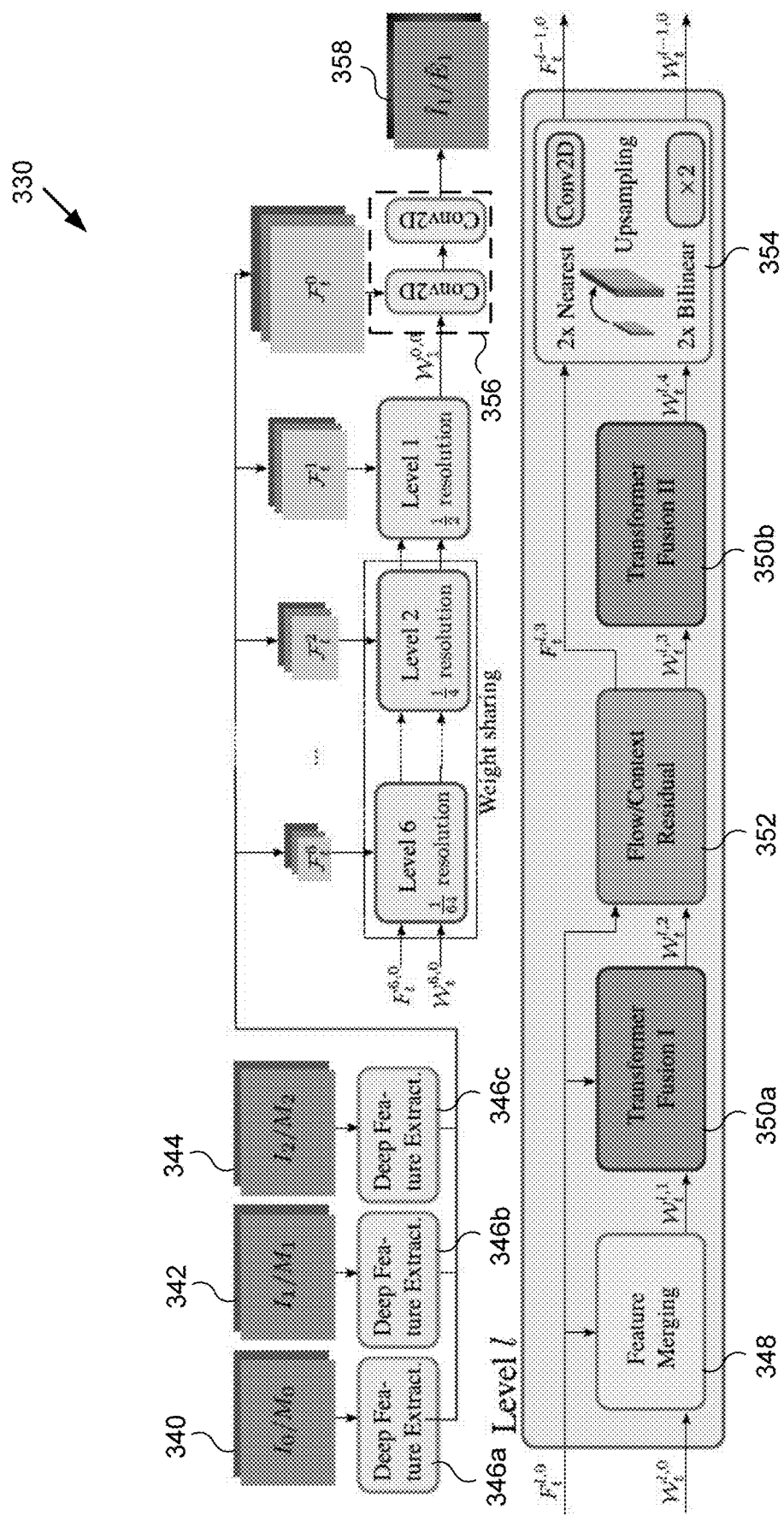
FIG. 3 shows an exemplary network architecture for providing a machine learning (ML) model-based video frame interpolator suitable for use in performing uncertainty-guided video frame interpolation, according to one implementation.

FIG. 3 shows an exemplary network architecture for providing ML model-based interpolator 330 suitable for use in performing uncertainty-guided video frame interpolation, according to one implementation. According to the exemplary implementation shown in FIG. 3, ML model-based video frame interpolator 330 includes one or more deep feature extraction blocks 346a, 346b, and 346c (hereinafter "feature extraction block(s) 346a/346b/346c"), feature merging block 348, first transformer fusion block 350a (hereinafter "first fusion block 350a"), flow/context residual block 352 (hereinafter "flow residual block 352"), second transformer fusion block 350b (hereinafter "second fusion block 350b"), upsampling block 354, and convolutional layers 356. Also shown in FIG. 3 are interpolation input 340 including first frame $I_0$ corresponding to first frame 222 in FIG. 2, and binary mask $M_0$ for first frame $I_0$ and corresponding to binary mask 224, interpolation input 342 including intermediate frame $I_1$ corresponding to intermediate frame 232 and binary mask $M_1$ for intermediate frame $I_1$ corresponding to binary mask 234, and interpolation input 344 including second frame $I_2$ corresponding to second frame 226 and binary mask $M_2$ for second $I_2$ corresponding to binary mask 228, as well as is interpolator output 358 including interpolated intermediate frame $\hat{I}_1$ and error map $\hat{E}_1$.

It is noted that although the architecture of ML model-based video frame interpolator 330 is depicted in FIG. 3 as including feature extraction block(s) 346a/346b/346c followed by feature merging block 348, followed by first fusion block 350a, followed by flow residual block 352, followed by second fusion block 350b, that representation is provided merely by way of example. In other implementations ML model-based video frame interpolator 330 may omit one of first fusion block 350a or second fusion block 350b. That is to say, in some implementations ML model-based video frame interpolator 330 may include feature extraction block(s) 346a/346b/346c, followed by feature merging block 348, followed by first fusion block 350a, followed by flow residual block 352, while in other implementations ML model-based video frame interpolator 330 may include feature extraction block(s) 346a/346b/346c, followed by feature merging block 348, followed by flow residual block 352, followed by second fusion block 350b.

Regarding the exemplary implementation shown in FIG. 3, it is further noted that although the depicted process uses three input video frames, i.e., respective first and second frames $I_0$ and $I_2$, and one intermediate frame $I_1$, that representation is also merely provided by way of example. In various implementations, because binary masks are used to drive the computation, even partial frames could be used as inputs. That is to say, the present uncertainty-guided frame interpolation solution takes a sequence of frames and masks as inputs and outputs a sequence of frames of the same length. Nevertheless, the present application focuses on a specific exemplary implementation using three input frames, including a first frame and a second frame are known, and an intermediate frame between the first frame and the second frame.

ML model-based video frame interpolator 330 corresponds in general to ML model-based video frame interpolator 230, in FIG. 2. Consequently, ML model-based video frame interpolator 230 may share any of the characteristics attributed to ML model-based video frame interpolator 330 by the present disclosure, and vice versa. It is noted that, according to the exemplary implementation of ML model-based video frame interpolator 330 depicted in FIG. 3, ML model-based video frame interpolator 330 is a transformer-based video frame interpolator.

Referring to FIGS. 2 and 3, the goal of the present uncertainty-guided video frame interpolation approach is to interpolate two frames $I_0$, $I_2$ (i.e., first frame 222 and second frame 226) and find the interpolated intermediate frame $\hat{I}_1$ along with an estimate of the error map $\hat{E}_1$. Subsequently, the error map is analyzed to determine if certain areas of the intermediate frame need to be rendered as they are expected to have insufficient quality based on interpolation alone. For example, pixels of the intermediate frame corresponding to portions of the error map failing to satisfy an error criteria, such as by exceeding an error threshold, for instance, may be deemed to have insufficient quality. Intermediate frame 232 and binary mask 234 for intermediate frame 232) are passed to ML model-based video frame interpolator 230 along with first and second frames $I_0$ and $I_2$ to get interpolated frame 236. It is noted that the present interpolation solution can handle the common problem of two-frame interpolation without any changes to the architecture or training and that the additional inputs provided as intermediate frame 232 ($I_1$) and binary mask 234 ($M_1$) for intermediate frame 232 are entirely optional, i.e., $I_1$ and $M_1$ may be set equal to zero ($I_1=0$, $M_1=0$).

Motivated by the goal to be able to handle arbitrary inputs, i.e., any sequence of frames or partial frames, in contrast to conventional two-frame interpolation methods, according to the present uncertainty-guided video frame interpolation approach there is little distinction within ML model-based video frame interpolator 230 between first and second frames $I_0$ and $I_2$ and intermediate frame $I_1$. Instead, each frame is equipped with a binary mask $M_t$ indicating valid inputs to guide the interpolation.

Referring to the specific implementation shown in FIG. 3, feature extraction block(s) 348a/348b/348c is/are used to extract a feature pyramid representation $\{\mathcal{F}_t^l\}_{l\in 0,\ldots,6}$ for each of interpolation inputs (a) 340 and 344, or (b) 340, 342, and 344, which are processed in a coarse-to-fine manner with the same update blocks that share weights for the bottom 5 resolutions. It is noted that a feature pyramid of an image is a representation of that image, which may be a learned representation, as a list of feature maps, where the resolution is halved from one pyramid level to the next. That means for level 0 the resolution is equal to the image resolution (height×width), and for level 1 height/2×width/2 is used, for level 2 height/4×width/4 is used, and so on. It is further noted that processing the interpolation inputs (a) 340 and 344, or (b) 340, 342, and 344 in a coarse-to-fine manner with the same refers to processing those inputs at multiple resolutions, starting from the lowest resolution and ending at the original image resolution.

It is also noted that although the specific implementation described in the present application utilizes a feature pyramid representation having six levels, that implementation is merely an example. In other implementations, such a feature pyramid representation may include fewer, or more than six levels.

In each of the levels, feature merging block 348 is used to merge the latent feature representations $W_t^{l,i}$ with the respective input feature pyramid level. Then, the latent representations are updated in first and second fusion blocks 350a and 350b with flow residual block 352 in between that additionally updates the running flow estimates $F_t^{l,i}$, denoting the optical flow from t to t+1. Finally, the latent feature representations and flows are upsampled at upsampling block 354 for processing in the next level. In order to reduce the memory and compute costs, the processing of the topmost level is treated differently and, according to the exemplary implementation shown in FIG. 3, includes two convolutional layers 356, although more or less than two convolutional layers, or even an alternative network architecture, could be utilized.

Figure 4:
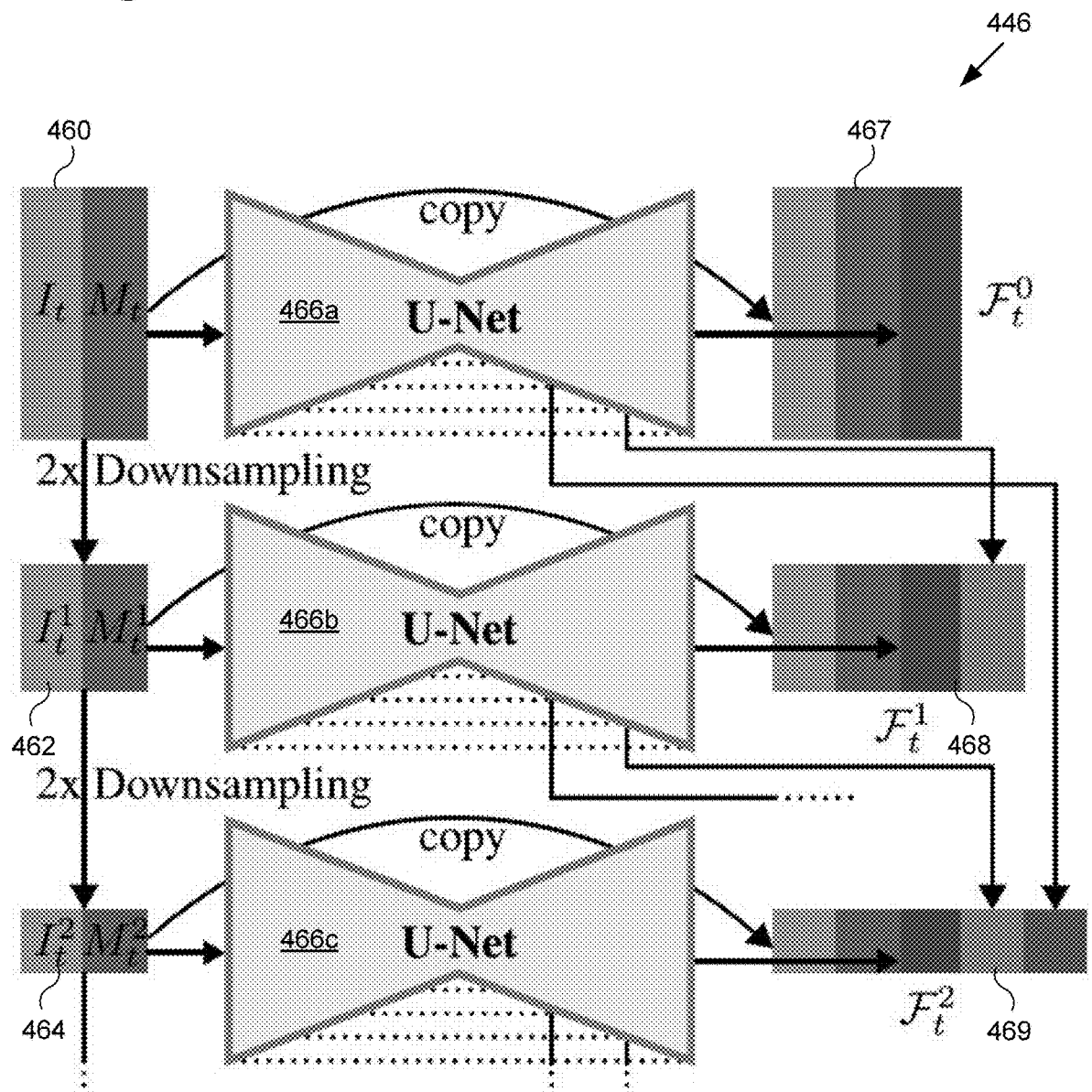
FIG. 4 shows a diagram of an exemplary feature extraction block of the ML model-based video frame interpolator of FIG. 3, according to one implementation.

FIG. 4 shows a diagram of exemplary feature extraction block 446, according to one implementation. It is noted that feature extraction block 446 corresponds in general to any one or all of feature extraction block(s) 346a/346b/346c, in FIG. 3. Thus, feature extraction block(s) 346a/346b/346c may share any of the characteristics attributed to feature extraction block 446 by the present disclosure, and vice versa.

As shown in FIG. 4, feature extraction block 446 is implemented using a U-Net architecture, rather than a traditional top-down approach, because the U-Net architecture more easily enables ML model-based video frame interpolator 230/330 to capture semantically meaningful features on the upper levels of the pyramid without the need for many convolutional layers with large kernels or dilation.

As further shown in FIG. 4, firstly, image $I_t^l$ and mask $M_t^l$ pyramids are built, where image/mask l is downsampled by a factor of 2 to obtain level l+1. The image and mask pyramids are concatenated to provide image/mask pairs 460, 462, and 464, which are passed through respective U-Nets 466a, 466b, and 466c, as illustrated in FIG. 4, keeping the last three layers as features. Finally, all input and feature tensors of the same spatial resolution are concatenated to build input feature pyramids $\{\mathcal{F}_t^l\}_{l\in 0,\ldots,6}$ (depicted in FIG. 4 by exemplary feature pyramids 467, 468, and 469). It is noted that all features from level two onward will be semantically similar and thus weight sharing can be used on all of those levels.

Thus, referring to FIGS. 2 and 3 in combination with FIG. 4, hardware processor 214 of system 200 may execute software code 220 to downsample interpolation inputs (a) 340 and 344, or (b) 340, 342, and 344, using feature extraction block(s) 346a/346b/346c/446 of ML model-based video frame interpolator 230/330 prior to generation of interpolated frame $\hat{I}_1$ and error map $\hat{E}_1$ to provide one or more lower resolution pairs of image and mask pyramids having respective spatial resolutions lower than the resolution of the interpolation inputs.

On the lowest level, level 6 merely by way of example, the optical flows $F_t^{6,0}$ are initialized as zero (0.0) and the latent feature representations $W_t^{6,0}$ are set to a learned vector that is spatially repeated. As the first step on each level, the upsampled pixel-wise features of the previous level, or the initial values $W_t^{l,0} \in \mathbb{R}^{D_l}$, are merged with their respective feature pyramid features $\mathcal{F}_t^l \in \mathbb{R}^{C_l}$ at feature merging block 348, in FIG. 3, where $C_0 := 52$, $C_1 := 148$, $C_{i\in\{2\ldots 6\}} := 340$, and $D_l := C_l + 15$. Therefore, only the first $C_l$ channels of $W_t^{l,0}$ are merged with while keeping the remaining fifteen channels unaffected:

$$W_t^{l,1} = \begin{bmatrix} M_t^l \mathcal{F}_t^l + (1 - M_t^l)[W_t^{l,0}]_{0 \dots C_l - 1} \\ [W_t^{l,0}]_{C_l \dots D_l - 1} \end{bmatrix} \quad \text{(Equation 1)}$$

With respect to the expression "channels" of $W_t^{l,0}$, it is noted that each entry in a feature pyramid is a three-dimensional (3D) tensor having shape (C, height, width) where C is the number of channels, as is common in neural networks.

Figure 5:
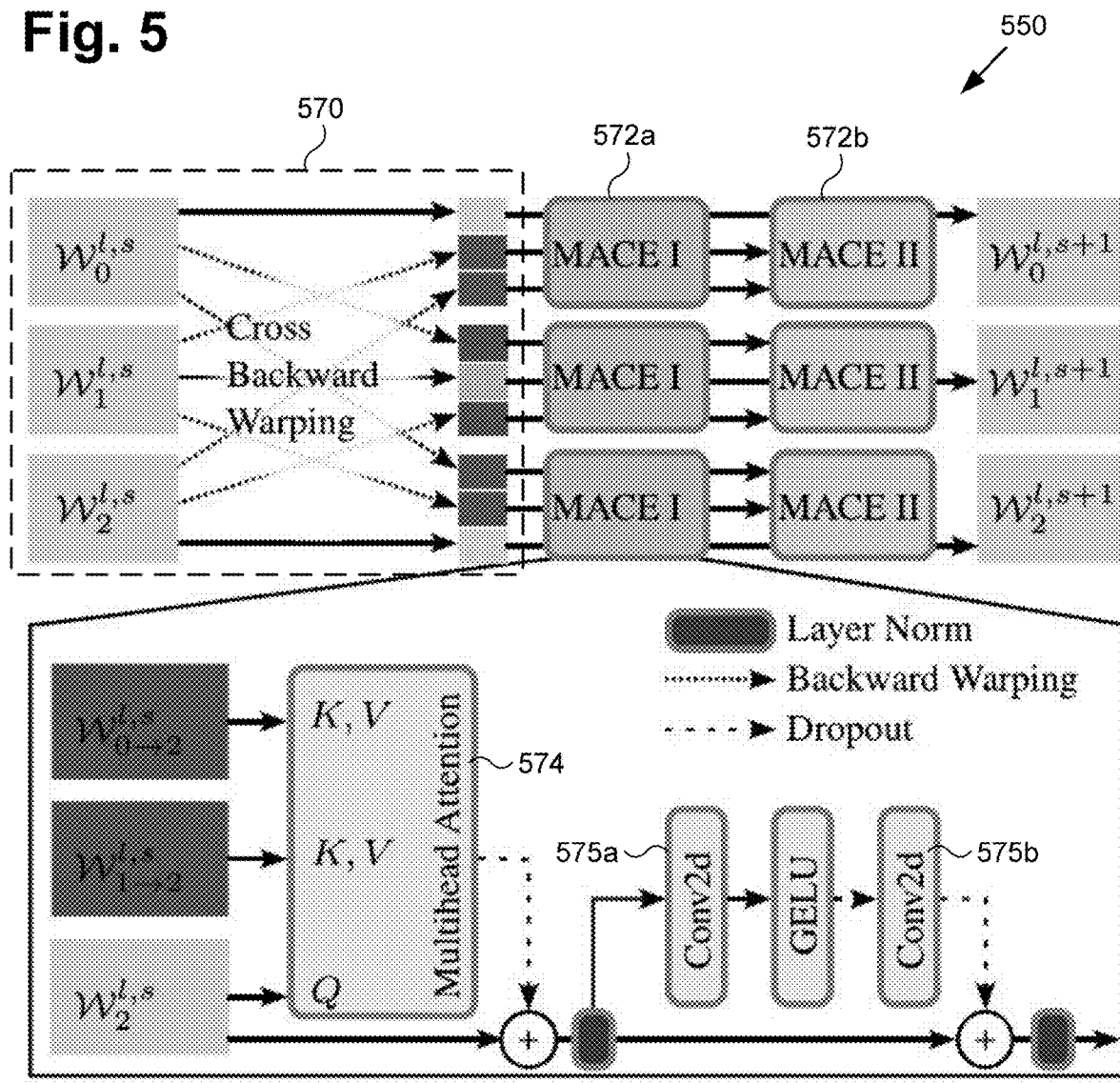
FIG. 5 shows a diagram of an exemplary fusion block of the ML model-based video frame interpolator of FIG. 3, according to one implementation.

FIG. 5 shows a diagram of exemplary fusion block 550. Fusion block 550 corresponds in general to either or both of first fusion block 350a and second fusion block 350b in FIG. 3. Consequently, first fusion block 350a and second fusion block 350b may share any of the characteristics attributed to fusion block 550 by the present disclosure, and vice versa.

To update the latent feature representation of each frame $t_0 \in \{0, 1, 2\}$, cross-backward warping 570 is used to align the features of all other frames $t_i \neq t_0$ by rescaling the present flow estimate at each processing step s of each level as:

$$W_{t_i \to t_0}^{l,s}(x,y) = W_{t_i}^{l,s}((t_0 - t_i) F_{t_i}^{l,s}(x,y)) \quad \text{(Equation 2)}$$

for spatial indices (x,y) and using bilinear interpolation for non-integer coordinates. The latent representations $W_{t_0}^{l,s}(x,y)$, $W_{t_1 \to t_0}^{l,s}(x,y)$, and $W_{t_2 \to t_0}^{l,s}(x,y)$ are treated as tokens processed by multihead attention module 574 of each of multihead-attention convolutional encoder (MACE) blocks I 572a and MACE blocks II 572b. It is noted that multihead attention module 574 may take the form of any suitable conventional implementation in which attention mechanisms are processed multiple times in parallel. It is further noted that although multihead attention modules in the conventional art are followed by linear layers, in the exemplary implementation shown in FIG. 5 and adopted herein, multihead attention module 574 is followed by convolutional layers 575a and 575b, hence the label multihead-attention convolutional encoder, or MACE block. Specifically, for each head i the per-pixel query $Q_i$, key tensor $K_i$, and value tensor $V_i$ are defined as:

$$Q_i = W_i^Q W_{t_0}^{l,s} \quad \text{(Equation 3)}$$

$$K_i = W_i^K [W_{t_1 \to t_0}^{l,s}, W_{t_2 \to t_0}^{l,s}] \quad \text{(Equation 4)}$$

$$V_i = W_i^V [W_{t_1 \to t_0}^{l,s}, W_{t_2 \to t_0}^{l,s}] \quad \text{(Equation 5)}$$

Due to the inherent spatial structure of the latent feature representations, the linear layers of the standard transformer architecture are replaced in fusion block 550 with convolutional residual layers. According to the exemplary implementation shown in FIG. 5, two convolutional layers 575a and 575b with kernel size 3, a dropout layer in which inputs are randomly set to 0 during training to prevent overfitting before and after second convolutional layer 575b, and a Gaussian Error Linear Unit (GELU) activation after first convolutional layer 575a are used. In addition, layer normalization may be used after the multihead attention and the convolutional layers, as is common in transformer architectures. It is noted that, in one implementation, two MACE blocks 572a and 572b are stacked for all transformer fusion modules, as shown in FIG. 5, except for the second transformer module on the second layer, which uses four MACE blocks.

The first and second fusion blocks 350a/550 and 350b/550 used for the feature updates may prove to be a poor choice for updating the flow estimate. Consequently, flow residual block 452 implemented as a convolution block is used to update the present flow estimate. After cross-backward warping the updated features to the reference frame, each pair ($W_t^{l,s}$, $W_{v \to t}^{l,s}$) is passed through a series of convolutions. The output of flow residual block 452 contains the following tensors (stacked in channel dimension): Weight $\alpha_v$, flow offset $\Delta_v^F$, and context residual $\Delta_v^W$ (It is noted that the level, time, and step indices of those expressions are dropped for ease of notation). Softmax is applied on the weights and the flows and context features are updated as:

$$F_t^{l,3} = F_t^{l,2} + \frac{\sum_v e^{\alpha_v} \frac{1}{v-t} \Delta_v^F}{\sum_v e^{\alpha_v}} \quad \text{(Equation 6)}$$

$$[W_t^{l,3}]_{C_l \dots D_l - 1} = [W_t^{l,2}]_{C_l \dots D_l - 1} + \frac{\sum_v e^{\alpha_v} \Delta_v^W}{\sum_v e^{\alpha_v}}. \quad \text{(Equation 7)}$$

It is noted that $\Delta_v^F$ needs to be rescaled to a forward flow for the update of $F_t^{l,3}$.

For the upsampling of the flows, a parameter-free bilinear interpolation by a scaling factor of two (denoted by † 2×) is used as:

$$F_t^{l,0} = 2F_t^{l+1,4} \dagger 2x. \quad \text{(Equation 8)}$$

The feature maps are passed through a resize convolution to avoid checkerboard artifacts, i.e., a nearest-neighbor upsampling followed by a convolutional layer with kernel size 2 and $D_l$ output feature channels.

Thus, referring to FIGS. 2 and 3 in combination, hardware processor 214 of system 200 may execute software code 220 to upsample, for each of the lower resolution pairs of image and mask pyramids, using ML model-based video frame interpolator 230/330, the respective outputs of second fusion block 350b and flow residual block 352 to match the resolution of interpolation inputs 340 and 344, or 340, 342, and 344.

For the final output, the latent representations $W_t^0$ together with the extracted features $\mathcal{F}_t^0$ are passed through two convolutional layers (356 in FIG. 3) with kernel sizes 3 and 1 respectively. The final output has five channels of which the first three form the color image $\hat{I}_t$ and the others correspond to the color error estimate $\hat{E}_t^c$ and the perceptual error estimate $E_t^P$. It is noted that the color error estimate $\hat{E}_t^c$ refers to the Euclidian distance between two colors, while the perceptual error estimate $E_t^P$ estimates the difference between two colors as a human would perceive them.

To train the error outputs $\hat{E}$ of ML model-based video frame interpolator 230/330 the target error maps are computed as follows. Let $I_t^{GT}$ be the ground truth frame at time t. The error targets or 'ground truth' is computed as:

$$E_t^c = \|I_t^{GT} - \hat{I}_t\|_2 \quad \text{(Equation 9)}$$

where $\|\cdot\|_2$ denotes the L2 norm along the channel dimension. The perceptual error $E_t^P$ follows the computation of Learned Perceptual Image Patch Similarity (LPIPS), as known in the art, without the spatial averaging. In order to prevent a detrimental influence of the error loss computations, gradients are not propagated from the error map computations to the color output and only gradient flow is allowed to the error prediction of ML model-based video frame interpolator 230/330.

It is desirable to use the error estimates $\hat{E}$ to find regions of the target frame that are expected to have insufficient quality based on interpolation alone, so that those areas can be rendered and passed to ML model-based video frame interpolator 230/330 in a second pass to improve the quality. Assuming that most common renderers should be able to operate on a subset of rectangular tiles without a significant overhead, the error estimates are averaged for those tiles, for which a size of 16×16 pixels may be chosen. Given a fixed budget for each frame, the tiles with the highest expected error may be selected and used in the second interpolation pass. It is noted that the highest expected error referenced above depends on which of the color error estimate $\hat{E}_t^c$ and the perceptual error estimate $E_t^p$ is being optimize for. It is further noted that the procedure described above is used to train ML model-based video frame interpolator 230/330 according to one exemplary use case, and that other procedures might be used to adapt to other specific goals, depending on the capabilities of different renderers.

Thus, the error map for the interpolated frame includes a color error estimate and a perceptual error estimate for the interpolated frame. Moreover, the error map for the interpolated frame may include a respective color error value and a respective perceptual error value for each of a plurality of image patches of the interpolated frame.

Moving to FIG. 6, FIG. 6 shows flowchart 690 outlining an exemplary method for performing uncertainty-guided video frame interpolation, according to one implementation. With respect to the method outlined in FIG. 6, it is noted that certain details and features have been left out of flowchart 690 in order not to obscure the discussion of the inventive features in the present application.

Referring to FIG. 6 in combination with FIGS. 2 and 3, flowchart 690 includes providing first frame 222 of video sequence 221, binary mask 224 for first frame 222, second frame 226 of video sequence 221, and binary mask 228 for second frame 226, as interpolation inputs 340 and 344 to ML model-based video frame interpolator 230/330 (action 691). As noted above, video sequence 221 includes a plurality of frames. As further noted above, first frame 222 of video sequence 221 may be any frame of video sequence 221 preceding second frame 226, while second frame 226 may be any frame of video sequence 221 following "first" frame 222. In some implementations, as shown in FIG. 2, video sequence 221 may be received from user system 238. Interpolation inputs 340 and 344 may be provided to ML model-based video frame interpolator 230/330, in action 691, by software code 220, executed by hardware processor 214 of system 200.

Continuing to refer to FIG. 6 in combination with FIGS. 2 and 3, in some implementations, flowchart 690 further includes providing as additional interpolation inputs to the ML model-based video frame interpolator 230/330, intermediate frame 232 of video sequence 221 and binary mask 234 for intermediate frame 232, the intermediate frame being a frame between the first frame and the second frame of the video sequence (action 692). It is noted that action 692 is optional, and may be omitted in use cases in which two-frame interpolation is performed. Furthermore, although flowchart 690 depicts optional action 692 as following action 691, in most implementations in which action 692 is performed, it is contemplated that actions 691 and 692 may be performed in parallel, i.e., contemporaneously. Additional interpolation inputs 342 may be provided to ML model-based video frame interpolator 230/330, in optional action 692, by software code 220, executed by hardware processor 214 of system 200.

Continuing to refer to FIG. 6 in combination with FIGS. 1 and 2, in implementations in which optional action 692 is omitted from the method outlined by flowchart 690, flowchart 690 further includes generating, using ML model-based video frame interpolator 230/330 and interpolation inputs 340 and 344, interpolated frame and error map 276 for interpolated frame 236 (action 693). As described above by reference to FIG. 5, generating the interpolated frame and error 276 map includes a cross-backward warping of respective latent feature representations of each of the plurality of frames included in video sequence 221.

It is noted that in implementations in which optional action 692 is included in the method outlined by flowchart 690, interpolated frame 236 and error map 276 for interpolated frame 236 are generated, in action 693, further using additional interpolation inputs 342. Action 693 may be performed by software code 220, executed by hardware processor 214 of system 200, and using ML model-based video frame interpolator 230/330, as described above by reference to FIGS. 2, 3, 4, and 5.

It is noted that error map 276 for interpolated frame 236 may serve as a quality metric for interpolated frame. Where error map 276 satisfies an error criteria, such as by including only error values falling below an error threshold, for example, interpolated frame 236 may deemed suitable for use without modification. However, where a portion of error map 276 fails to satisfy such an error criteria, an image portion of interpolated frame 236 corresponding to the portion of error map 276 failing to satisfy the error criteria may be deemed to be of unsuitable image quality. In use cases in which a portion of error map 276 fails to satisfy the error criteria, interpolated frame 236 may be supplemented with a rendered image portion corresponding to the portion of the error map failing to satisfy the error criteria.

Thus although in some implementations, the method outlined by flowchart 690 may conclude with action 693, described above. In other implementations, as shown in FIG. 6, flowchart 690 further includes interposing, when error map 276 satisfies an error criteria, interpolated frame 236 between first frame 222 and second frame 226 (action 694). Interposition of interpolated frame 236 between first frame 222 and second frame 226 in action 694 may be performed by software code 220, executed by hardware processor 214 of system 200.

Alternatively, as also shown in FIG. 6, flowchart 690 may further include interposing, when a portion of error map 276 fails to satisfy the error criteria, interpolated frame 236 supplemented with a rendered image portion corresponding to the portion of the error map failing to satisfy the error criteria, between first frame 222 and second frame 226 (action 695). Interposition of interpolated frame 236 supplemented with the rendered image portion corresponding to the portion of the error map failing to satisfy the error criteria between first frame 222 and second frame 226, in action 695, may be performed by software code 220, executed by hardware processor 214 of system 200.

With respect to the actions described in flowchart 690, It is noted that actions 691 and 693, or actions 691, 693, and 694, or actions 691, 693, and 695, or actions 691, 692, and 693, or actions 691, 692, 693, and 694, or actions 691, 692, 693, and 695, may be performed in a substantially automated process from which human involvement can be omitted.

Thus, the present application discloses systems and methods for performing uncertainty-guided video frame interpolation that address and overcome the deficiencies in the conventional art. The ML model-based video frame interpolator disclosed in the present application offers a number of advantages. For example, the ML model-based video frame interpolator disclosed herein improves the generalization capabilities of the method across video content of a variety of types, such as live action content and rendered content including animation. In addition, a partial rendering pass of the intermediate frame, guided by the estimated error, can be utilized during the interpolation to generate a new frame of superior quality.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
    a hardware processor;
    a system memory storing a software code; and
    a machine learning (ML) model-based video frame interpolator;
    the hardware processor configured to execute the software code to:
        provide a first frame of a video sequence including a plurality of frames, a binary mask for the first frame, a second frame of the video sequence, and a binary mask for the second frame, as interpolation inputs to the ML model-based video frame interpolator;
        generate, using the ML model-based video frame interpolator and the interpolation inputs, an interpolated frame and an error map for the interpolated frame;
        wherein generating the interpolated frame and the error map includes a cross-backward warping of respective latent feature representations of each of the plurality of frames.

2. The system of claim 1, wherein the error map for the interpolated frame includes a color error estimate and a perceptual error estimate for the interpolated frame.

3. The system of claim 1, wherein the error map for the interpolated frame includes a respective color error value and a respective perceptual error value for each of a plurality of image patches of the interpolated frame.

4. The system of claim 1, wherein the ML model-based video frame interpolator is a transformer-based video frame interpolator.

5. The system of claim 1, wherein the hardware processor is further configured to execute the software code to:
    provide, as additional interpolation inputs to the ML model-based video frame interpolator, an intermediate frame of the video sequence, and a binary mask for the intermediate frame, the intermediate frame being a frame between the first frame and the second frame of the video sequence;
    wherein the additional interpolation inputs are used to generate the interpolated frame and the error map for the interpolated frame.

6. The system of claim 1, wherein the hardware processor is further configured to execute the software code to:
    interpose the interpolated frame between the first frame and the second frame.

7. The system of claim 1, wherein the ML model-based video frame interpolator comprises:
    a feature extraction block,
    a feature merging block, and
    (i) a fusion block followed by a flow residual block, or (ii) the flow residual block followed by the fusion block.

8. The system of claim 1, wherein the ML model-based video frame interpolator sequentially comprises a feature extraction block, a feature merging block, a first fusion block, a flow residual block, and a second fusion block.

9. The system of claim 7, wherein the hardware processor is further configured to execute the software code to:
    downsample the interpolation inputs, using the feature extraction block of the ML model-based video frame interpolator, prior to generation of the interpolated frame and the error map to provide at least one lower resolution pair of image and mask pyramids having a resolution lower than a resolution of the interpolation inputs.

10. The system of claim 9, wherein the hardware processor is further configured to execute the software code to:
    upsample, for the at least one lower resolution pair of image and mask pyramids, using the ML model-based video frame interpolator, respective outputs of the fusion block and the flow residual block to match the resolution of the interpolation inputs.

11. A method for use by a system including a hardware processor and a system memory storing a software code and a machine learning (ML) model-based video frame interpolator, the method comprising: a hardware processor;
    providing, by the software code executed by the hardware processor, a first frame of a video sequence including a plurality of frames, a binary mask for the first frame, a second frame of the video sequence, and a binary mask for the second frame as interpolation inputs to the ML model-based video frame interpolator;
    generating, by the software code executed by the hardware processor and using the ML model-based video frame interpolator and the interpolation inputs, an interpolated frame and an error map for the interpolated frame;
    wherein generating the interpolated frame and the error map includes a cross-backward warping of respective latent feature representations of each of the plurality of frames.

12. The method of claim 11, wherein the error map for the interpolated frame includes a color error estimate and a perceptual error estimate for the interpolated frame.

13. The method of claim 11, wherein the error map for the interpolated frame includes a respective color error value and a respective perceptual error value for each of a plurality of image patches of the interpolated frame.

14. The method of claim 11, wherein the ML model-based video frame interpolator is a transformer-based video frame interpolator.

15. The method of claim 11, further comprising:
    providing, by the software code executed by the hardware processor, as additional interpolation inputs to the ML model-based video frame interpolator, an intermediate frame of the video sequence, and a binary mask for the intermediate frame, the intermediate frame being a frame between the first frame and the second frame of the video sequence;
    wherein the additional interpolation inputs are used to generate the interpolated frame and the error map for the interpolated frame.

16. The method of claim 11, further comprising:
interposing, by the software code executed by the hardware processor, the interpolated frame between the first frame and the second frame.

17. The method of claim 11, wherein the ML model-based video frame interpolator comprises:
a feature extraction block,
a feature merging block, and
(i) a fusion block followed by a flow residual block or (ii) the flow residual block followed by the fusion block.

18. The method of claim 11, wherein the ML model-based video frame interpolator sequentially comprises a feature extraction block, a feature merging block, a first fusion block, a flow residual block, and a second fusion block.

19. The method of claim 17, further comprising:
downsampling the interpolation inputs, by the software code executed by the hardware processor and using the feature extraction block of the ML model-based video frame interpolator, prior to generation of the interpolated frame and the error map, to provide at least one lower resolution pair of image and mask pyramids having a resolution lower than a resolution of the interpolation inputs.

20. The method of claim 19, further comprising:
upsampling, for the at least one lower resolution pair of image and mask pyramids, by the software code executed by the hardware processor and using the ML model-based video frame interpolator, respective outputs of the fusion block and the flow residual block to match the resolution of the interpolation inputs.

* * * * *